US008836695B2

(12) United States Patent
Park et al.

(10) Patent No.: US 8,836,695 B2
(45) Date of Patent: Sep. 16, 2014

(54) IMAGE PROCESSING APPARATUS AND METHOD OF RENDERING USING A RAY TRACING SCHEME

(75) Inventors: Chan Min Park, Seoul (KR); Sung Jin Son, Yongin-si (KR); In Sung Ihm, Seoul (KR); Duk Hyun Cha, Namyangju-si (KR)

(73) Assignees: Samsung Electronics Co., Ltd., Suwon-Si (KR); Industry-University Cooperation Foundation, Seoul (KR)

( * ) Notice: Subject to any disclaimer, the term of this patent is extended or adjusted under 35 U.S.C. 154(b) by 494 days.

(21) Appl. No.: 12/968,896

(22) Filed: Dec. 15, 2010

(65) Prior Publication Data
US 2011/0187714 A1 Aug. 4, 2011

(30) Foreign Application Priority Data

Feb. 1, 2010 (KR) ........................ 10-2010-0009025

(51) Int. Cl.
*G06T 15/00* (2011.01)
*G06T 15/50* (2011.01)

(52) U.S. Cl.
CPC ...................................... *G06T 15/50* (2013.01)
USPC ......................................................... 345/419

(58) Field of Classification Search
CPC ....... G06T 3/4007; G06T 15/06; G06T 15/08; G06T 15/50–15/87
USPC ................................................. 345/419–427
See application file for complete search history.

(56) References Cited

U.S. PATENT DOCUMENTS

| 5,729,672 | A | * | 3/1998 | Ashton | 345/589 |
| 6,128,407 | A | * | 10/2000 | Inoue et al. | 382/167 |
| 6,642,932 | B2 | * | 11/2003 | Kok et al. | 345/606 |
| 6,956,570 | B2 | | 10/2005 | Munshi | |
| 6,999,078 | B1 | * | 2/2006 | Akerman et al. | 345/424 |
| 8,040,352 | B2 | * | 10/2011 | Busch et al. | 345/427 |
| 8,081,185 | B2 | * | 12/2011 | Matsuoka | 345/427 |
| 2008/0122841 | A1 | | 5/2008 | Brown et al. | |
| 2008/0231628 | A1 | | 9/2008 | Shearer | |
| 2009/0225080 | A1 | | 9/2009 | Keller et al. | |

FOREIGN PATENT DOCUMENTS

| KR | 10-0894136 | 4/2009 |
| KR | 10-2009-0065353 | 6/2009 |

OTHER PUBLICATIONS

Ma et al., A Data Distributed, Parallel Algorithm for Ray-Traced Volume Rendering, PRS '93 Proceedings of the 1993 Symposium on Parallel Rendering, ACM, 1993, pp. 15-23.*

* cited by examiner

*Primary Examiner* — Xiao Wu
*Assistant Examiner* — Charles Tseng
(74) *Attorney, Agent, or Firm* — Staas & Halsey LLP

(57) ABSTRACT

Provided is an image processing apparatus. Ray tracing may be performed using a general scheme with respect to a plurality of reference pixels among pixels of an image to be rendered. With respect to a pixel excluding the reference pixels, geometry information may be interpolated based on a ray tracing result of adjacent reference pixels.

16 Claims, 9 Drawing Sheets

IMAGE PROCESSING APPARATUS AND METHOD OF RENDERING USING A RAY TRACING SCHEME

CROSS-REFERENCE TO RELATED APPLICATIONS

This application claims the priority benefit of Korean Patent Application No. 10-2010-0009025, filed on Feb. 1, 2010, in the Korean Intellectual Property Office, the disclosure of which is incorporated herein by reference.

BACKGROUND

1. Field

One or more embodiments relate to rendering of an object configured as a three-dimensional (3D) model, and more particularly, to rendering using a ray tracing scheme.

2. Description of the Related Art

Among schemes of rendering a three-dimensional (3D) model, a ray tracing scheme indicates a scheme of inversely tracing a progress direction of light by performing a collision check operation between an object and rays corresponding to pixels in a camera view.

The ray tracing scheme may well represent a reflective object, for example, a glass, a smooth metal surface, etc., and thus a rendered image may have a high quality. However, a large amount of calculations may be used for a collision check to trace a reflective path or a transmitting path of a ray. Accordingly, a high hardware performance may be used to render a 3D model according to the ray tracing scheme.

In particular, when a dynamic scene is rendered in real time for an application of a 3D game, a virtual reality, a virtual world, etc., a large amount of calculations may be used to process the real-time ray tracing. Accordingly, it may be difficult to perform the real-time ray tracing with a general hardware performance.

SUMMARY

Additional aspects of embodiments will be set forth in part in the description which follows and, in part, will be apparent from the description, or may be learned by practice of the disclosure.

The foregoing and or other aspects are achieved by providing an image processing apparatus, including: a processor; a first calculator to calculate first geometry information corresponding to a first pixel and second geometry information corresponding to a second pixel by performing a ray tracing operation with respect to each of the first pixel and the second pixel among pixels constituting an image to be rendered; a second calculator to determine a similarity between the first geometry information and the second geometry information; and a third calculator to calculate third geometry information corresponding to a third pixel adjacent to the first pixel and the second pixel based on the first geometry information and the second geometry information when the first geometry information is determined to be similar to the second geometry information, wherein at least one of the first calculator, the second calculator and the third calculator use the processor to perform the calculating or determining.

When the first geometry information is determined to be similar to the second geometry information, the third calculator may calculate the third geometry information by performing linear interpolation of the first geometry information and the second geometry information.

When an object identifier (ID) of the first geometry information matches an object ID of the second geometry information, the second calculator may determine that the first geometry information is similar to the second geometry information.

When an inner product between a normal vector of the first geometry information and a normal vector of the second geometry information is greater than or equal to a threshold value, the second calculator may determine that the first geometry information is similar to the second geometry information.

The second calculator may calculate a first direction vector from a position of the first geometry information to a position of the second geometry information, and calculate a second direction vector from the position of the second geometry information to the position of the first geometry information. When a multiplication result of an inner product between a normal vector of the first geometry information and the first direction vector, and an inner product between a normal vector of the second geometry information and the second direction vector is greater than or equal to a threshold value, the second calculator may determine that the first geometry information is similar to the second geometry information.

The second calculator may calculate a first direction vector from a position of the first geometry information to a position of the second geometry information, and a second direction vector of a secondary ray corresponding to the first pixel. When an inner product between the first direction vector and the second direction vector of the secondary ray corresponding to the first pixel is greater than or equal to a threshold value, the second calculator may determine that the first geometry information is similar to the second geometry information.

When a shadow bit of the first geometry information is different from a shadow bit of the second geometry information, the second calculator may determine that the first geometry information is not similar to the second geometry information.

The first calculator may divide the image into a plurality of blocks, select the first pixel from a first block among the plurality of blocks, and select the second pixel from a second block among the plurality of blocks.

The foregoing and/or other aspects are achieved by providing an image processing method, including: calculating first geometry information corresponding to a first pixel and second geometry information corresponding to a second pixel by performing a ray tracing operation with respect to each of the first pixel and the second pixel among pixels constituting an image to be rendered; determining a similarity between the first geometry information and the second geometry information; and calculating third geometry information corresponding to a third pixel adjacent to the first pixel and the second pixel based on the first geometry information and the second geometry information when the first geometry information is determined to be similar to the second geometry information.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
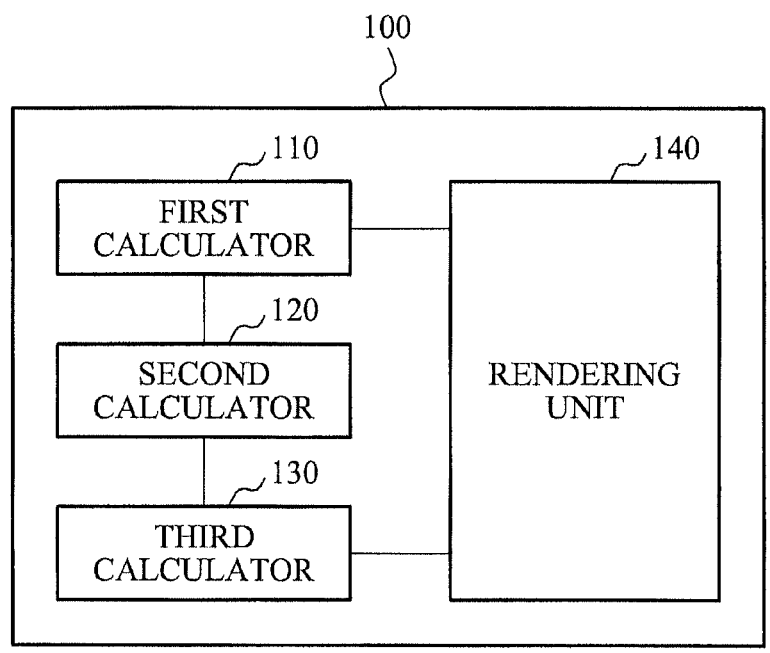
FIG. 1 illustrates an image processing apparatus according to at least one embodiment.

Reference will now be made in detail to at least one embodiment, examples of which are illustrated in the accompanying drawings, wherein like reference numerals refer to the like elements throughout. At least one embodiment is described below to explain the present disclosure by referring to the figures.

FIG. 1 illustrates an image processing apparatus 100 according to at least one embodiment.

When rendering a three-dimensional (3D) model using an existing ray tracing scheme, an intersection, that is, a collision between each ray and an object of the 3D model may be calculated by tracing a progress path of each ray from each of pixels of an image to be rendered.

The above calculation corresponds to a process of calculating geometry information of an object portion corresponding to each of the pixels. In general, various schemes, for example, a kd tree, and the like may be used.

Research on optimization schemes of a calculation algorithm is actively conducted. However, a process of calculating geometry information of an intersecting object portion by tracing the progress path of each ray may take a large amount of calculations and bandwidths, and thus may act as a bottleneck portion in the entire image processing process.

According to at least one embodiment, instead of calculating geometry information by directly tracing a progress path of each ray with respect to all of the pixels of an image to be rendered, the image processing apparatus 100 may calculate geometry information with respect to only a sample ray, that is, a reference ray, and apply the calculation result to other pixels and thus may reduce an unnecessary ray tracing calculation.

A first calculator 110 may perform general ray tracing by selecting a plurality of reference pixels from pixels of the image to be rendered, and by performing a ray tracing operation with respect to the selected reference pixels.

The plurality of reference pixels may be selected using various schemes. For example, the image may be divided into a plurality of blocks and a single reference pixel may be selected from each of the blocks. A block division and a selection of the reference pixel will be further described with reference to FIG. 2.

With respect to the reference pixels obtained through the ray tracing operation, geometry information of an object portion intersecting a primary ray, a secondary ray, and the like may be calculated.

In the case of a third pixel that is a pixel unselected as the reference pixel and is spatially adjacent to a first pixel and a second pixel among the plurality of reference pixels, for example, in the case of the third pixel existing between the first pixel and the second pixel, geometry information corresponding to the third pixel may be estimated based on first geometry information corresponding to the first pixel and second geometry information corresponding to the second pixel.

When the first geometry information is similar to the second geometry information, an object portion intersected by a ray departed from the first pixel and an object portion intersected by a ray departed from the second pixel may have a high similarity or correlation. Accordingly, in the case of the third pixel existing between the first pixel and the second pixel, it is possible to estimate that the third pixel may also have a high similarity.

However, when the first geometry information is not similar to the second geometry information, each of the first pixel and the second pixel may correspond to a different object. Even though the first pixel and the second pixel correspond to the same object, a change may be great. Accordingly, it may be impossible to estimate third geometry information corresponding to the third pixel based on the first geometry information and the second geometry information. Specifically, a ray tracing operation may be separately performed with respect to the third pixel.

A second calculator 120 may determine a similarity between first geometry information corresponding to the first pixel and second geometry information corresponding to the second pixel, based on a ray tracing calculation result with respect to the first pixel and the second pixel that are reference pixels.

The similarity may be determined according to various examples.

As one example, the second calculator 120 may compare an object ID of first geometry information with an object ID of second geometry information. When the object ID of the first geometry information matches the object ID of the second geometry information, the second calculator 120 may determine that the first geometry information is similar to the second geometry information. This example will be further described with reference to FIG. 3.

As another example, the second calculator 120 may compare a normal vector of first geometry information and a normal vector of second geometry information. When a similarity between an object portion corresponding to the first pixel and an object portion corresponding to the second pixel is high, the object ID of the first geometry information may match the object ID of the second geometry information, and the normal vector of the first geometry information may also be similar to the normal vector of the second geometry information. Even in the case of the same object, in both sides of a corner having different surfaces, a progress direction of a ray may greatly vary during a ray tracing process and thus a similarity between corresponding normal vectors may be low.

Accordingly, the second calculator 120 may calculate an inner product between the normal vector of the first geometry information and the normal vector of the second geometry information. When the inner product is greater than or equal to a first threshold, the second calculator 120 may determine that the first geometry information is similar to the second geometry information. This example will be further described with reference to FIG. 4.

As another example, in addition to the normal vector of the first geometry information and the normal vector of the second geometry information, a position of the first geometry information and a position of the second geometry information may be used to determine the similarity. Here, the position denotes spatial coordinates of an object portion colliding with a corresponding ray.

When the object has a fluctuation, a similarity of object geometry information may not be guaranteed despite that the normal vectors are similar to each other. This example will be further described with reference to FIG. 5.

As still another example, the second calculator 120 may compare a shadow bit value of the first geometry information with a shadow bit value of the second geometry information. When the shadow bit value of the first geometry information is the same as the shadow bit value of the second geometry information, the second calculator 120 may determine that the first geometry information is similar to the second geometry information.

In path tracing of a secondary ray instead of a primary ray, even though a progress path of the primary ray is similar to a progress path of the secondary ray, a discontinuity of an object surface may significantly change the progress path of the secondary ray.

Accordingly, when tracing the path of the secondary ray, whether to calculate third geometry information may be determined using a direction vector of the secondary ray based on the first geometry information, and also using the first geometry information and the second geometry information. This example will be further described with reference to FIG. 6.

All or a portion of examples associated with the similarity decision may be applicable.

The aforementioned examples are only exemplary schemes to determine a criterion of determining whether to calculate geometry information of the third pixel using a result of a ray tracing operation with respect to the first pixel and a ray tracing operation with respect to the second pixel.

Accordingly, the examples are not limited and various modifications and changes may be made.

When the second calculator 120 determines that the first geometry information is similar to the second geometry information, a third calculator 130 may calculate third geometry information corresponding to the third pixel based on the first geometry information and the second geometry information.

Since an operation of performing direct ray tracing with respect to the third pixel and searching for an intersection with an object is omitted, a calculation amount may significantly decrease.

Conversely, when the second calculator 120 determines that the first geometry information is not similar to the second geometry information, ray tracing may be performed with respect to the third pixel through direct ray path tracing, which is the same as the first pixel or the second pixel.

An operation of the third calculator 130 will be further described with reference to FIG. 7.

When the first calculator 110 performs ray tracing by tracing a ray path with respect to reference pixels including the first pixel and the second pixel, and the third calculator 130 calculates geometry information with respect to remaining pixels including the third pixel and excluding the reference pixels based on a decision result of the second calculator 120, a rendering unit 140 may render the image.

Figure 2:
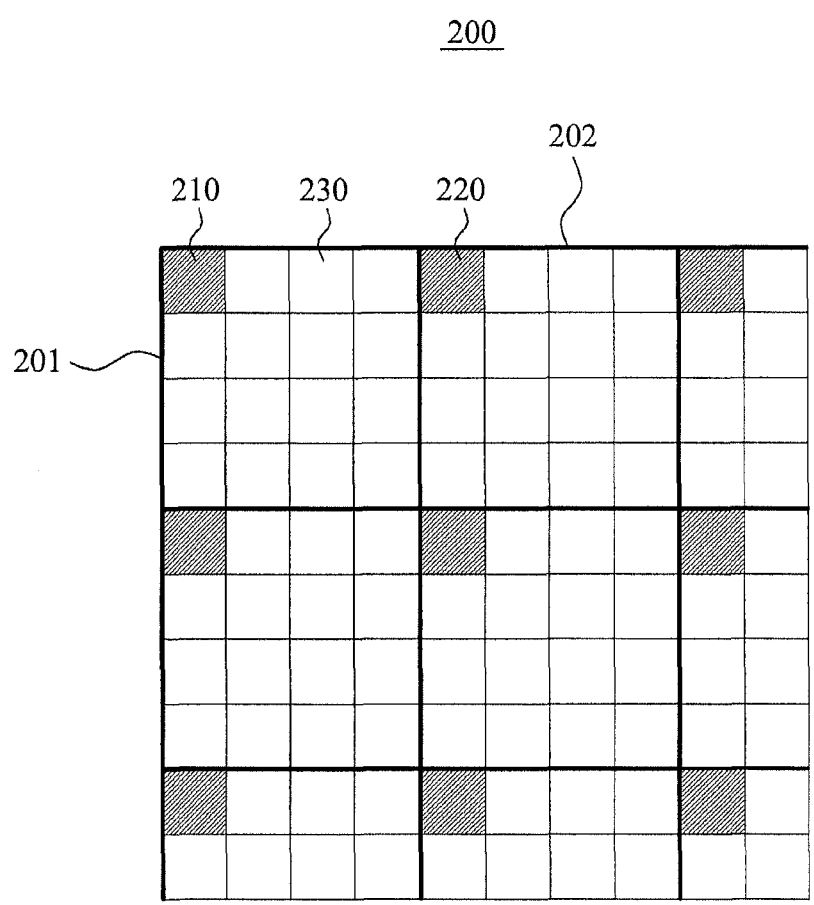
FIG. 2 illustrates pixels constituting an image to be rendered according to at least one embodiment.

FIG. 2 illustrates pixels constituting an image 200 to be rendered according to at least one embodiment.

The image 200 may include a plurality of pixels.

The pixels of the image 200 may be divided into a plurality of blocks including a block 201 and 202, and a single reference pixel may be selected from each of the blocks.

It is assumed that a 4×4 block division, for example, is performed and a left-most top pixel, for example, a first pixel 210 and a second pixel 220 are each selected as a reference pixel from each of the blocks.

Path tracing of a primary ray, a secondary ray, and the like may be performed with respect to the selected reference pixels according to a general scheme, whereby ray tracing may be performed.

With respect to pixels excluding the reference pixels, geometry information of at least two reference pixels may be compared. When a similarity between the geometry information of the at least two reference pixels is determined, the geometry information may be calculated using a linear interpolation. When the similarity is not determined, ray tracing may be performed with respect to the pixels excluding the reference pixels according to the general scheme.

In the case of the first pixel 210 and the second pixel 220 selected as the reference pixels, geometry information may be calculated through ray tracing.

The geometry information may include a triangle identification (ID) of an intersecting portion between a ray and an object, an object ID, a position of an intersection, a normal vector, texture coordinates, a shadow bit, and the like.

In the case of a third pixel 230 existing between the first pixel 210 and the second pixel 220, a similarity between first geometry information corresponding to the first pixel 210 and second geometry information corresponding to the second pixel 220 may be determined. When the first geometry information is determined to be similar to the second geometry information, third geometry information corresponding to the third pixel 230 may be calculated by interpolating the first geometry information and the second geometry information.

Hereinafter, the similarity decision will be further described with reference to FIGS. 3 through 6.

Figure 3:
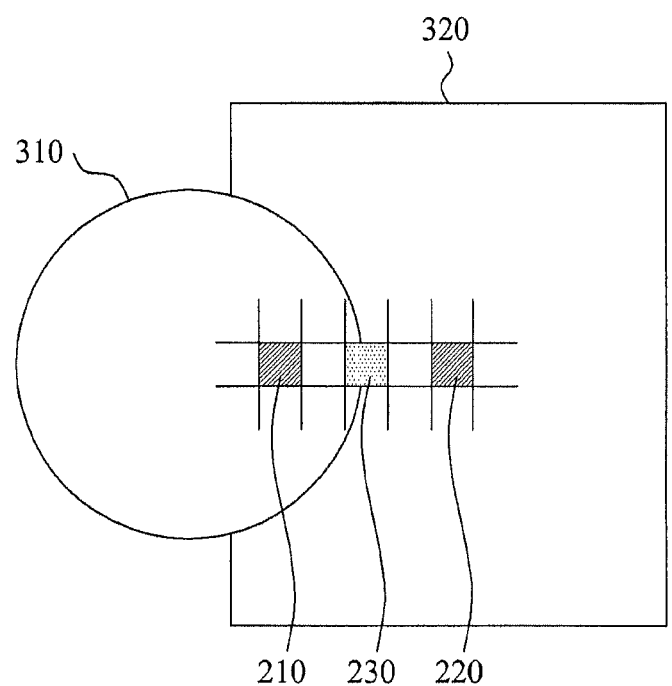
FIG. 3 illustrates a process of determining a similarity of geometry information based on an object identifier (ID) according to at least one embodiment.

FIG. 3 illustrates a process of determining a similarity of geometry information based on an object ID according to at least one embodiment.

An object 310 indicates an object of first geometry information corresponding to a first pixel 210, and an object 320 indicates an object of second geometry information corresponding to a second pixel 220.

As shown in FIG. 3, an object ID of the first geometry information is different from an object ID of the second geometry information.

In this case, it may be impossible to estimate in advance an object corresponding to a third pixel 230 between the objects 310 and 320. Accordingly, the first geometry information may be determined to not be similar to the second geometry information, and thus ray tracing may be performed with respect to the third pixel 230.

Figure 4:
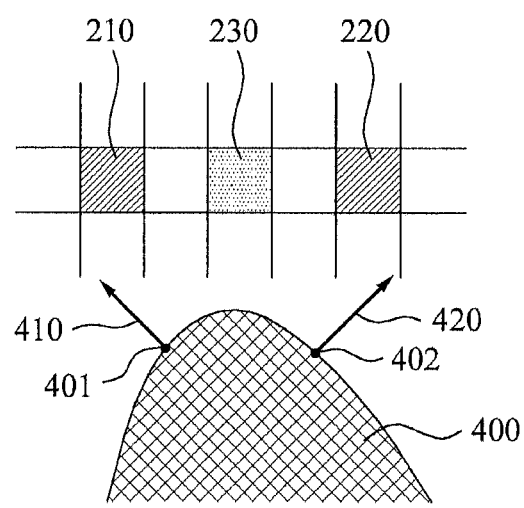
FIG. 4 illustrates a process of determining a similarity of geometry information by comparing normal vectors of the geometry information according to at least one embodiment.

FIG. 4 illustrates a process of determining a similarity of geometry information by comparing normal vectors of the geometry information according to at least one embodiment.

An inner product between a normal vector 410 of an object portion 401 corresponding to a first pixel 210 and a normal vector 420 of an object portion 402 corresponding to a second pixel 220 may be calculated.

As shown in FIG. 4, when directions of the normal vectors 410 and 420 are significantly different, the calculated inner product may be zero or be closer to a negative number. Even in the same object 400, when a fluctuation is great, object geometry information may vary greatly.

Accordingly, only when the calculated inner product is greater than or equal to a first threshold, then first geometry information corresponding to the first pixel 210 may be determined to be similar to second geometry information corresponding to the second pixel 220, and otherwise, may be determined to not be similar to the second geometry information.

Figure 5:
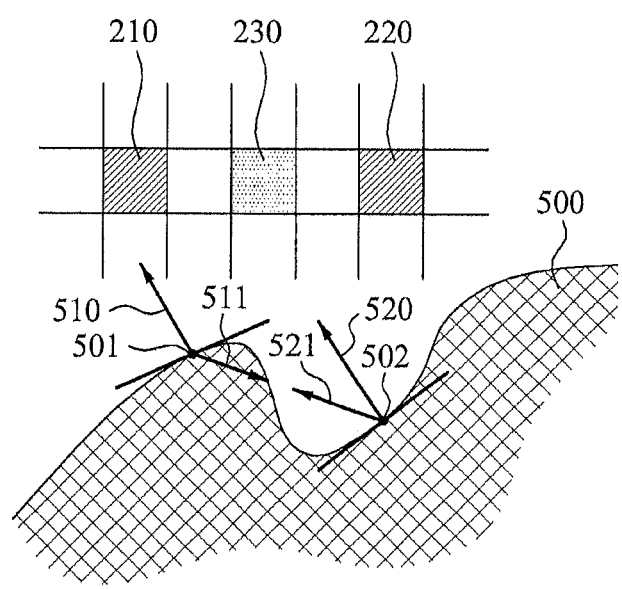
FIG. 5 illustrates a process of determining a similarity of geometry information by comparing position information and a normal vector of geometry information according to at least one embodiment.

FIG. 5 illustrates a process of determining a similarity of geometry information by comparing position information and a normal vector of geometry information according to at least one embodiment.

When a fluctuation exists on a surface of a single object 500, object geometry information may be significantly different, however, directions of normal vectors may be similar to each other.

Therefore, a first direction vector 511 from a position 501 of first geometry information to a position 502 of second geometry information and a second direction vector 521 from the position 502 of the second geometry information to the position 501 of the first geometry information may be calculated.

An inner product between a normal vector 510 of the first geometry information and the first direction vector 511 may be multiplied by an inner product between a normal vector 520 of the second geometry information and the second direction vector 521.

When a multiplication result is greater than or equal to a second threshold, the first geometry information may be determined to be similar to the second geometry information, and otherwise, the first geometry information may be determined to not be similar to the second geometry information.

In addition to the aforementioned examples, when a shadow bit of the first geometry information is different from a shadow bit of the second geometry information, the first geometry information may be determined to not be similar to the second geometry information, which is described above with reference to FIG. 1. Here, the shadow bit indicates whether a corresponding area is a shadow area.

Figure 6:
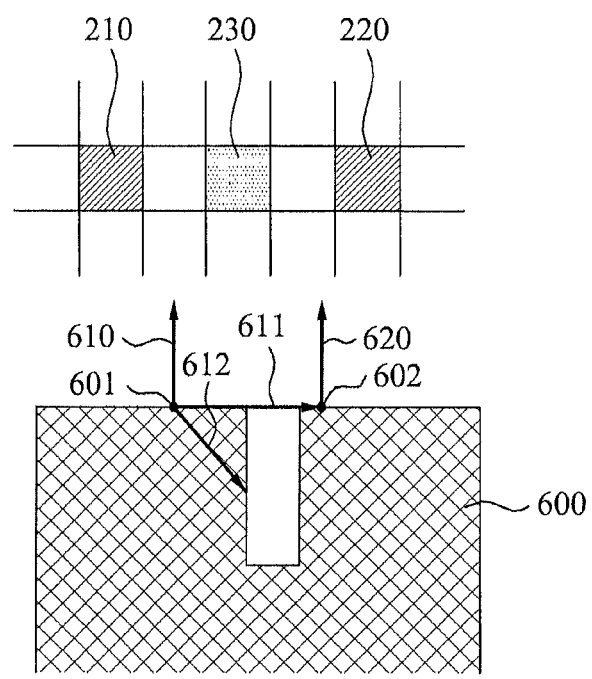
FIG. 6 illustrates a process of determining a similarity of geometry information based on a secondary ray according to at least one embodiment.

FIG. 6 illustrates a process of determining a similarity of geometry information based on a secondary ray according to at least one embodiment.

During a ray tracing process, even though a progress path of a primary ray is the same, a progress path of a secondary ray may be different depending on a reflective direction or a transmitting direction. In this case, it may be difficult to indirectly calculate geometry information of a third pixel 230 based on geometry information of a first pixel 210 and geometry information of a second pixel 220.

Thus, when calculating geometry information for path tracing of the secondary ray, an inner product between a direction vector 611 from a position 601 of an object 600 portion corresponding to the first pixel 210 to a position 602 of an object portion corresponding to the second pixel 220 and a direction vector 612 of the secondary ray corresponding to the first pixel 210 may be calculated.

When the calculated inner product is greater than or equal to a third threshold, third geometry information may be indirectly calculated based on first geometry information and second geometry information for path tracing of the secondary ray. Otherwise, entire ray tracing may be directly performed with respect to the third pixel 230. Normal vectors 610 and 620 may be used for the similarity decision, which is the same as described above with reference to FIGS. 3 through 5.

Figure 7:
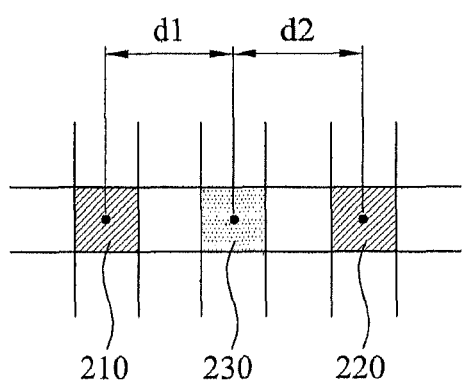
FIG. 7 illustrates a process of performing linear interpolation of geometry information according to at least one embodiment.

FIG. 7 illustrates a process of performing linear interpolation of geometry information according to at least one embodiment.

In the embodiments of FIGS. 3 through 6, when first geometry information corresponding to a first pixel 210 is determined to be similar to second geometry information corresponding to a second pixel 220, third geometry information corresponding to a third pixel 230 that is not a reference pixel may be calculated by interpolating the first geometry information and the second geometry information.

During the interpolation process, linear interpolation may be performed to be in proportion to a distance d1 between the first pixel 210 and the third pixel 230, and a distance d2 between the second pixel 220 and the third pixel 230.

As described above, interpolated geometry information may include a triangle ID, an object ID, a position of an intersection, a normal vector, texture coordinates, a shadow bit, etc.

Due to the interpolation, a ray path tracing operation may be omitted. Accordingly, a large portion of the ray path tracing operation may be omitted. Therefore, the entire ray tracing rate may be enhanced. It may become an important factor in an application of real-time 3D rendering and the like.

In the conventional art, a color value of a rendered pixel may be interpolated in a color space. According to at least one embodiment, since geometry information is interpolated in a physical space, a large portion of ray-object intersection calculations used during a ray path tracing process may be omitted. Accordingly, it is possible to prevent a deterioration of a screen quality occurring when using an existing scheme.

Figure 8:
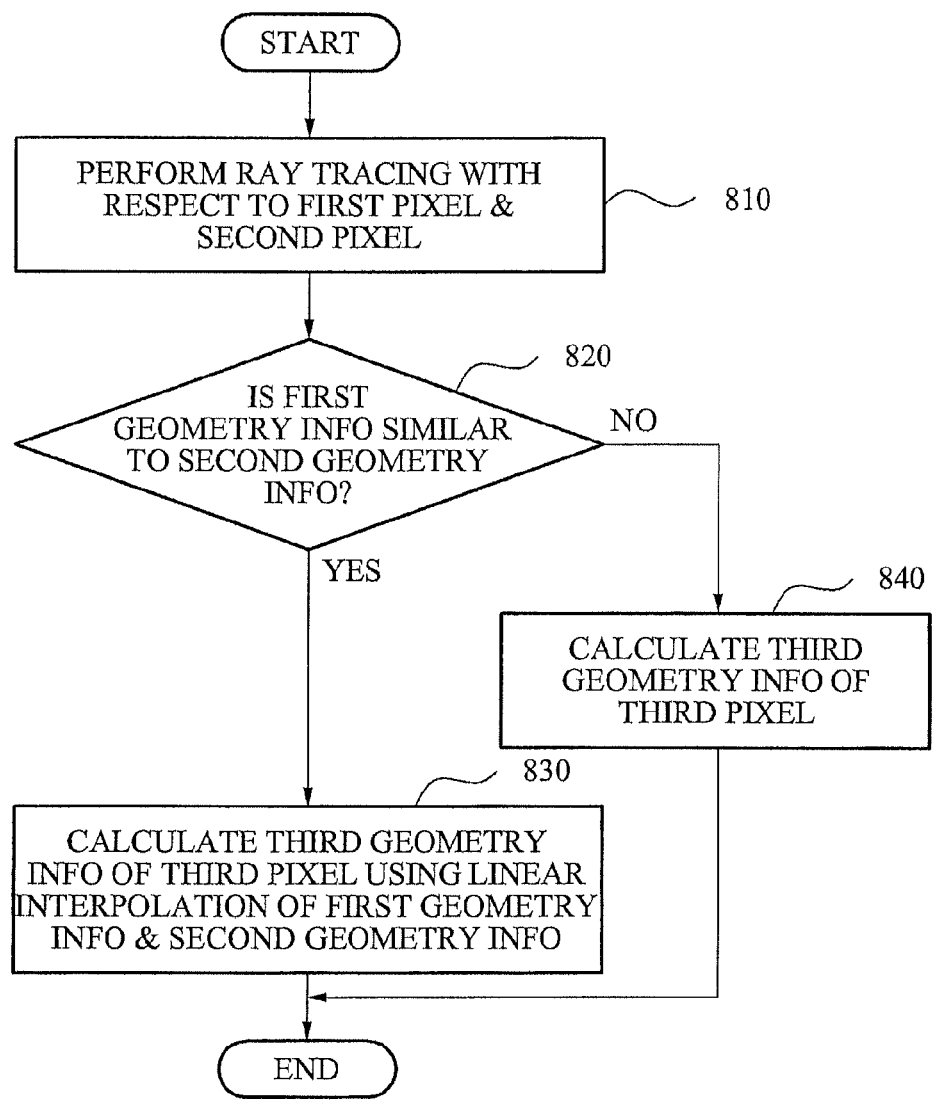
FIG. 8 is a flow chart illustrating an image processing method according to an embodiment.

FIG. 8 illustrates an image processing method according to an embodiment.

In operation 810, ray tracing may be performed using a general scheme with respect to a first pixel and a second pixel selected as reference pixels.

In operation 820, whether first geometry information is similar to second geometry information may be determined.

The above similarity decision may be performed using various examples, as described above with reference to FIGS. 3 through 6.

When the first geometry information is determined to be similar to the second geometry information, third geometry information corresponding to a third pixel may be calculated through linear interpolation of the first geometry information and the second geometry information in operation 830. The linear interpolation is described above with reference to FIG. 7.

Conversely, when the first geometry information is determined to not be similar to the second geometry information, the third geometry information may be calculated by performing general ray tracing with respect to the third pixel in operation 840.

Figure 9:
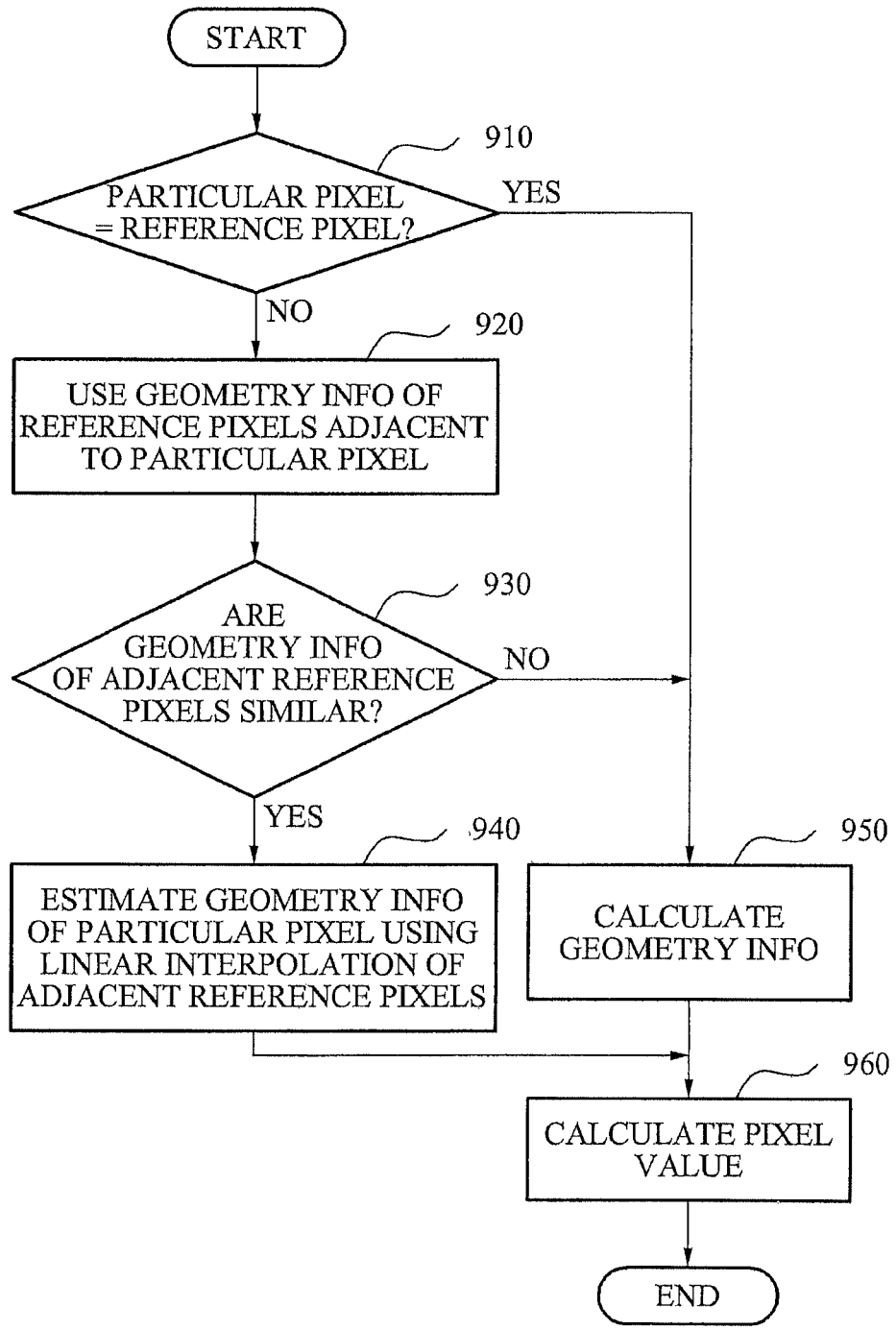
FIG. 9 is a flow chart illustrating a rendering process using a ray tracing scheme in an image processing method according to at least one embodiment.

FIG. 9 illustrates a rendering process using a ray tracing scheme in an image processing method according to at least one embodiment.

When calculating a color value of a particular pixel according to the ray tracing scheme, whether the particular pixel corresponds to a reference pixel may be determined in operation 910.

When the particular pixel corresponds to the reference pixel, geometry information may be calculated according to a general ray tracing scheme in operation 950. During this process, ray path tracing may be performed as is and a calculation amount may not decrease.

In operation 960, the pixel value may be calculated.

Conversely, when the particular pixel does not correspond to the reference pixel, geometry information calculated by performing ray tracing of reference pixels adjacent to the particular pixel may be used in operation 920.

When the geometry information of the adjacent reference pixels are determined to be similar to each other in operation 930, geometry information of the particular pixel may be estimated by performing linear interpolation of the geometry information of the adjacent reference pixels in operation 940.

Conversely, when the geometry information of the adjacent reference pixels are determined to not be similar to each other in operation 930, the geometry information of the particular pixel may be calculated by performing general ray tracing to the particular pixel in operation 950.

The image processing method according to the above-described embodiments may be recorded in non-transitory computer-readable media, including program instructions to implement various operations embodied by a computer. The media may also include, alone or in combination with the program instructions, data files, data structures, etc. Examples of non-transitory computer-readable media include magnetic media, such as hard disks, floppy disks, and magnetic tape; optical media, such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Any of the units, including, for example, the calculators 110, 120, 130 and/or rendering unit 140 may operate by causing a processor to execute operations as disclosed above.

Although at least one embodiment has been shown and described, it would be appreciated by those skilled in the art that changes may be made in the at least one embodiment without departing from the principles and spirit of the disclosure, the scope of which is defined by the claims and their equivalents.

What is claimed is:

1. An image processing apparatus, comprising:
a processor;
a first calculator to calculate first geometry information corresponding to a first pixel and second geometry information corresponding to a second pixel by performing a ray tracing operation with respect to each of the first pixel and the second pixel among pixels constituting an image to be rendered;
a second calculator to determine a similarity between the first geometry information and the second geometry information; and
a third calculator to calculate third geometry information corresponding to a third pixel adjacent to the first pixel and the second pixel based on the first geometry information and the second geometry information when the first geometry information is determined to be similar to the second geometry information,
wherein the first geometry information and the second geometry information include at least one of a position of a pixel, an object identifier (ID) and a normal vector,
wherein the similarity is determined based on at least one of the position of the pixel, the object ID and the normal vector,
wherein the third geometry information is calculated without performing the ray tracing operation, and wherein at least one of the first calculator, the second calculator and the third calculator use the processor to perform the calculating or determining,
wherein the first calculator divides the image into a plurality of blocks, selects the first pixel from a first block among the plurality of blocks, and selects the second pixel from a second block among the plurality of blocks, and
wherein a location of the first pixel in the first block is identical to a location of the second pixel in the second block.

2. The image processing apparatus of claim 1, wherein:
the third calculator calculates the third geometry information by performing linear interpolation of the first geometry information and the second geometry information when the first geometry information is determined to be similar to the second geometry information.

3. The image processing apparatus of claim 1, wherein:
the second calculator determines that the first geometry information is similar to the second geometry information when an object ID of the first geometry information matches an object ID of the second geometry information.

4. The image processing apparatus of claim 1, wherein:
the second calculator determines that the first geometry information is similar to the second geometry information when an inner product between a normal vector of the first geometry information and a normal vector of the second geometry information is greater than or equal to a threshold value.

5. The image processing apparatus of claim 1, wherein:
the second calculator calculates a first direction vector from a position of the first geometry information to a position of the second geometry information, and calculates a second direction vector from the position of the second geometry information to the position of the first geometry information, and
when a multiplication result of an inner product between a normal vector of the first geometry information and the first direction vector, and an inner product between a normal vector of the second geometry information and the second direction vector is greater than or equal to a threshold value, the second calculator determines that the first geometry information is similar to the second geometry information.

6. The image processing apparatus of claim 1, wherein: the second calculator calculates a first direction vector from a position of the first geometry information to a position of the second geometry information and a second direction vector of a secondary ray corresponding to the first pixel, and
when an inner product between the first direction vector and the second direction vector of the secondary ray corresponding to the first pixel is greater than or equal to a threshold value, the second calculator determines that the first geometry information is similar to the second geometry information.

7. The image processing apparatus of claim 1, wherein:
the second calculator determines that the first geometry information is not similar to the second geometry information when a shadow bit of the first geometry information is different from a shadow bit of the second geometry information.

8. The image processing apparatus of claim 1, wherein the third calculator calculates the third geometry information by performing a direct path ray tracing operation on the third pixel, when the second calculator determines that the first geometry information is dissimilar to the second geometry information, instead of calculating the third geometry information based on the first geometry information and the second geometry information.

9. An image processing method, comprising:
calculating, by a processor, first geometry information corresponding to a first pixel and second geometry information corresponding to a second pixel by performing a ray tracing operation with respect to each of the first pixel and the second pixel among pixels constituting an image to be rendered;
determining a similarity between the first geometry information and the second geometry information; and
calculating third geometry information corresponding to a third pixel adjacent to the first pixel and the second pixel based on the first geometry information and the second geometry information when the first geometry information is determined to be similar to the second geometry information,
wherein the first geometry information and the second geometry information include at least one of a position of a pixel, an object identifier (ID) and a normal vector,
wherein the similarity is determined based on at least one of the position of the pixel, the object ID and the normal vector, and
wherein the third geometry information is calculated without performing the ray tracing operation,
wherein the calculating of the first geometry information and the second geometry information comprises dividing the image into a plurality of blocks, selecting the first pixel from a first block among the plurality of blocks, and selecting the second pixel from a second block among the plurality of blocks, and
wherein a location of the first pixel in the first block is identical to a location of the second pixel in the second block.

10. The image processing method of claim 9, wherein the calculating of the third geometry information comprises calculating the third geometry information by performing linear interpolation of the first geometry information and the second geometry information when the first geometry information is determined to be similar to the second geometry information.

11. The image processing method of claim 9, wherein the determining of the similarity includes determining that the first geometry information is similar to the second geometry information when an object ID of the first geometry information matches an object ID of the second geometry information.

12. The image processing method of claim 9, wherein the determining of the similarity includes determining that the first geometry information is similar to the second geometry information when an inner product between a normal vector of the first geometry information and a normal vector of the second geometry information is greater than or equal to a threshold value.

13. The image processing method of claim 9, wherein the determining of the similarity comprises:
calculating a first direction vector from a position of the first geometry information to a position of the second geometry information and a second direction vector of a secondary ray corresponding to the first pixel; and
determining that the first geometry information is similar to the second geometry information when an inner product between the first direction vector and the second direction vector of the secondary ray corresponding to the first pixel is greater than or equal to a threshold value.

14. The image processing method of claim 9, wherein the determining of the similarity includes determining that the first geometry information is not similar to the second geometry information when a shadow bit of the first geometry information is different from a shadow bit of the second geometry information.

15. The image processing method of claim 9, wherein the determining of the similarity comprises:
calculating a first direction vector from a position of the first geometry information to a position of the second geometry information and a second direction vector of a secondary ray corresponding to the first pixel; and
determining that the first geometry information is similar to the second geometry information when a multiplication result of an inner product between a normal vector of the first geometry information and the first direction vector, and an inner product between a normal vector of the second geometry information and the second direction vector is greater than or equal to a threshold value.

16. A non-transitory computer-readable medium comprising a program to instruct a computer to perform the method of claim 9.

* * * * *